United States Patent
Karlsson et al.

(10) Patent No.: US 6,535,942 B1
(45) Date of Patent: Mar. 18, 2003

(54) METHOD FOR REDUCING PROCESSOR INTERRUPT LOAD

(75) Inventors: Marcus Karlsson, Luleå (SE); Benny Hedman, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/500,653

(22) Filed: Feb. 9, 2000

(51) Int. Cl.[7] .............................. G06F 9/48; G06F 9/50
(52) U.S. Cl. ......................................... 710/260; 370/310
(58) Field of Search ............................... 710/260, 263, 710/266, 48, 52; 709/201, 300; 370/310

(56) References Cited

U.S. PATENT DOCUMENTS 5,648,777 A * 7/1997 Bays et al.
6,085,277 A * 7/2000 Nordstrom et al.
6,240,483 B1 * 5/2001 Gutta et al.

FOREIGN PATENT DOCUMENTS

EP  0459 714 A2  12/1991
JP  07093259    4/1995

OTHER PUBLICATIONS

J. Eric Roskos, Ching–Dong Hsieh; "Data–Movement Primitives"; BYTE; vol. 10 No. 5 May 1985 (1985), pp. 239–252; XP000921181.
EPO Search RS 104543 US; completed Jun. 29, 2000.

* cited by examiner

Primary Examiner—Gopal C. Ray

(57) ABSTRACT

A method for reducing interrupt load in a multi-processor system is disclosed, whereby two central processors executing a real-time operating system can communicate with each other using a shared memory. A start pointer and end pointer are implemented preferably in logic. By detecting a difference in the logic values for the two pointers, the receiving CPU will receive interrupts only when new data from the sending CPU has arrived in the shared memory and the shared memory was empty. Consequently, the operating system will not be disturbed with unnecessary interruptions, and the interrupt load will thus be low.

24 Claims, 1 Drawing Sheet

METHOD FOR REDUCING PROCESSOR INTERRUPT LOAD

BACKGROUND OF THE INVENTION

1. Technical Field of the Invention

The present invention relates to the computer processing field and, in particular, to a method for reducing interrupt load in a multi-processor system. Such a multi-processor system can be implemented in, but not necessarily limited to, a Base Transceiver Station (BTS) in a mobile communications system.

2. Description of Related Art

In certain multi-processor applications, two (or more) Central Processor Units (CPUs) can communicate through use of a shared memory. For example, a BTS which has been developed by Ericsson for use in a Wideband Code Division Multiple Access (WCDMA) mobile communication system, includes a main processor board with two interoperable CPUs. These two CPUs can communicate with (e.g., send data to) each other through a shared memory unit. Nevertheless, the load on such a shared memory can be relatively high, and the number of interrupts needed for an operating system to process such inter-CPU communications can also be quite high.

For example, one common method used to communicate or convey data between two such CPUs is to employ a dual port First-In First-Out (FIFO) shared memory. With this method, the inter-CPU communication interrupts and associated data are processed sequentially (FIFO). However, a significant problem with the existing dual port FIFO memories is that they are quite expensive and relatively inefficient to use. Also, in certain applications (e.g., a Wideband BTS), with the exceedingly high load projected for inter-CPU communications in such applications, the use of dual port FIFO shared memories for such applications will not be feasible.

Another common method used to communicate or convey data between two such CPUs is to employ a shared memory area referred to as a mailbox. Using this method, the CPU sending data first writes the data into a mailbox area shared with the receiving CPU, and then transmits an interrupt for that CPU. Responsive to the interrupt from the sending CPU, the receiving CPU reads the stored data from the mailbox area. However, a significant problem with the existing mailbox approach used for inter-CPU communications is that the more data units (e.g., packets) being sent, the more times the receiving CPU will be interrupted. As such, the number of interrupts to be processed in this way can be exceedingly high.

A third common method used to communicate or convey data between two such CPUs is to employ two shared memory areas. Using this method, one memory area contains a ring buffer, and the other memory area contains two pointers. One pointer (referred to as an end pointer) is updated by the CPU which is sending data, and the second pointer (referred to as a start pointer) is updated by the receiving CPU. With this method, the receiving CPU can poll the end pointer for changes, or alternatively, the receiving CPU can be interrupted for each new data unit (e.g., packet) to be received (similar to the above-described mailbox method). Notably, a variation of this third method (i.e., increasing efficiency through buffer usage) is disclosed in U.S. Pat. No. 5,548,728 to Danknick.

In summary, the most significant problems associated with the use of the above-described (and other similar) inter-CPU communication methods is that the existing CPU load-consuming circuitry is not feasible for the high load applications to be implemented in the future (e.g., Wideband BTS inter-CPU communications). Also, for those applications being implemented in a real-time operational system (RTOS), their operations will be relatively inefficient if they are being interrupted a high percentage of time. For example, a projection for Wideband BTS applications is that 30% of the CPU capacity will be utilized for processing interrupts if the above-described inter-CPU communication methods are used. In any event, as described in detail below, the present invention successfully resolves the above-described and other related problems.

SUMMARY OF THE INVENTION

In accordance with a preferred embodiment of the present invention, a method for reducing interrupt load in a multi-processor system is provided, whereby two CPUs executing a real-time operating system can communicate with each other using a shared memory. A start pointer and end pointer are implemented in logic. By detecting a difference in the logic values for the two pointers, the receiving CPU will receive interrupts only when new data from the sending CPU has arrived in the shared memory and the shared memory was empty. Consequently, the operating system will not be disturbed with unnecessary interruptions, and the interrupt load will thus be low.

An important technical advantage of the present invention is that the CPU interrupt load can be significantly reduced, because a receiving CPU will be interrupted only when new data from the sending CPU has arrived in the shared memory area.

Another important technical advantage of the present invention is that a CPU does not have to be interrupted while a large amount of data is being transferred from another CPU.

Still another important technical advantage of the present invention is that a receiving CPU is not required to poll a shared memory location in order to find new data conveyed from another CPU.

Yet another important technical advantage of the present invention is that since a receiving CPU will be interrupted only when the load is relatively low, the overall CPU capacity will be increased for handling a relatively large amount of data using a shared memory.

Still another important technical advantage of the present invention is that since the real-time operating system will not be interrupted to a great extent, the operating system's behavior will be more stable.

Still another important technical advantage of the present invention is that the pointers and method can be implemented in relatively inexpensive, uncomplicated logic.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
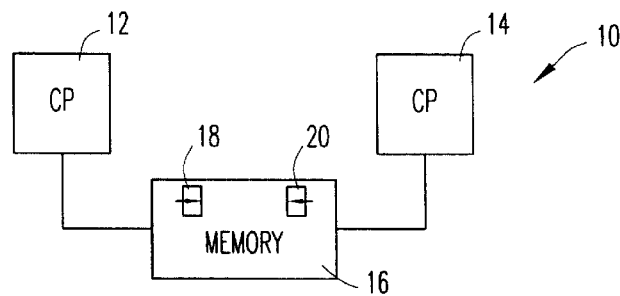
FIG. 1 is a simplified block diagram of a multi-processor system that can be used to implement the preferred embodiment of the present invention.
Figure 2:
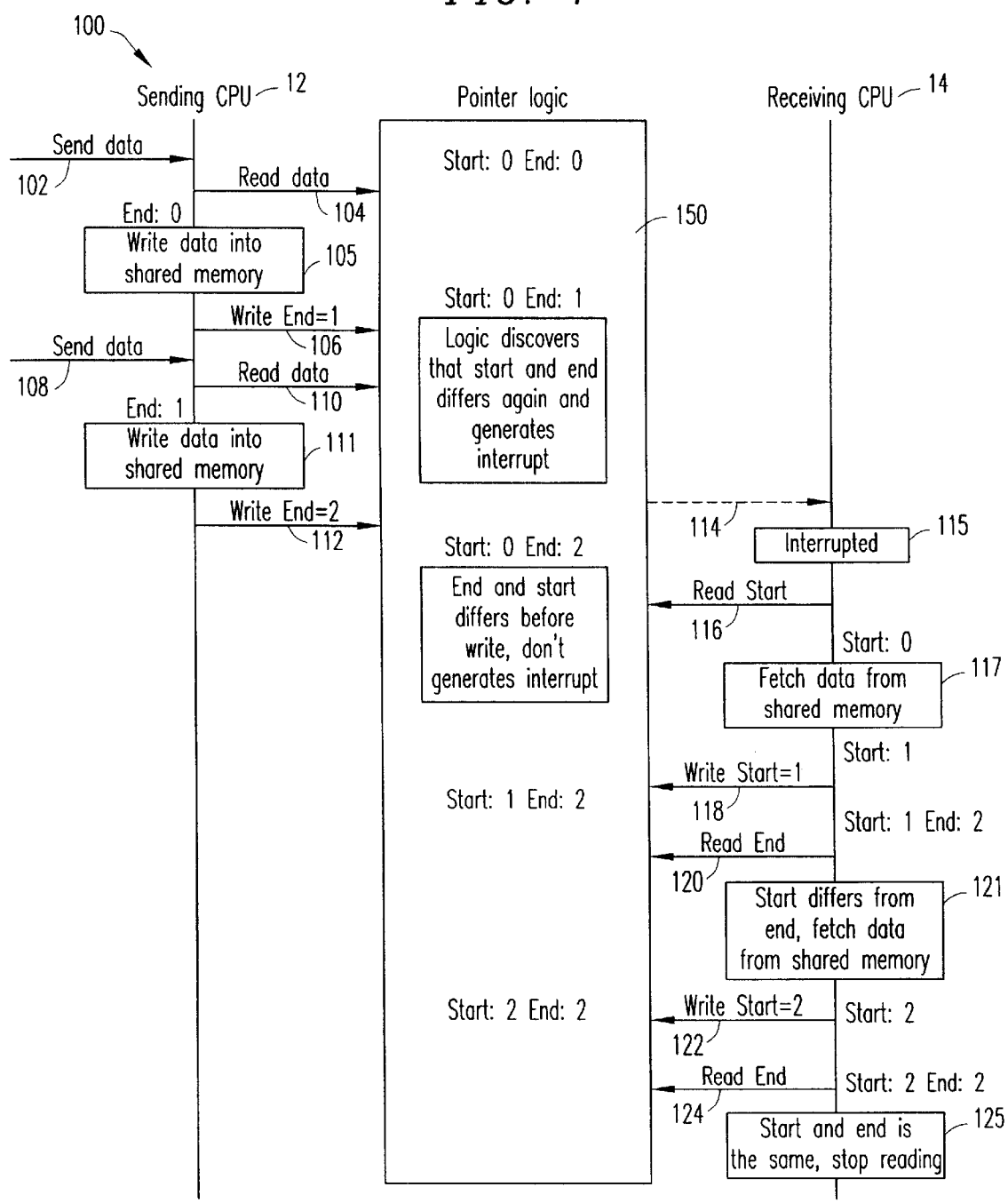
FIG. 2 is a diagram that illustrates a method that can be used for reducing interrupt load in a multi-processor system, such as, for example, the multi-processor system shown in FIG. 1.

The preferred embodiment of the present invention and its advantages are best understood by referring to FIGS. 1–2 of the drawings, like numerals being used for like and corresponding parts of the various drawings.

Essentially, in accordance with a preferred embodiment of the present invention, a method for reducing interrupt load in a multi-processor system is provided, whereby two CPUs executing a real-time operating system can communicate with each other using a shared memory. A start pointer and end pointer are implemented in logic. By detecting a difference in the logic values for the two pointers, the receiving CPU will receive interrupts only when new data from the sending CPU has arrived in the shared memory and the shared memory was empty. Consequently, the operating system will not be disturbed with unnecessary interrupts, and the interrupt load will thus be low.

Specifically, FIG. 1 is a simplified block diagram of a multi-processor system 10 that can be used to implement the preferred embodiment of the present invention. FIG. 2 is a diagram that illustrates a method 100 that can be used for reducing interrupt load in a multi-processor system, such as, for example, the multi-processor system 10 shown in FIG. 1. FIG. 2 also illustrates pointer logic that can be used with respect to the method 100 shown. In particular, the present invention can be implemented for inter-CPU communications in a BTS for a WCDMA mobile communications system (e.g., in a 3rd Generation Partnership Project System BTS). However, the invention is not intended to be so limited and can be used for any multi-processor application wherein a large amount of data is to be transferred between CPUs (e.g., via shared or similar types of memory).

Referring to FIG. 1, in accordance with this exemplary embodiment, a multi-processor system 10 includes a first CPU 12 and a second CPU 14. A shared memory area 16 is connected for communication of data between the first CPU 12 and the second CPU 14. The shared memory area 16 includes a start pointer 18 and an end pointer 20. For this embodiment, the start pointer and end pointer can be implemented in logic (e.g., FPGA, ASIC, TTL, etc.), which is denoted by the block 150. As such, each pointer can represent or reference (point to) a respective address or location in the shared memory area 16. Notably, although a single shared memory is shown in FIG. 1, the present invention is not so limited and can include other memory configurations (e.g., two shared memory areas).

Referring now to FIGS. 1 and 2, the method 100 for reducing interrupt load is initiated when one CPU intends to pass data to a second CPU. Notably, for illustrative purposes only, the sending CPU is shown as CPU 12, and the receiving CPU is shown as CPU 14. Alternatively, the sending CPU could be CPU 14, and the receiving CPU could be CPU 12.

At step 102, the sending CPU 12 initiates the method 100 by determining that data is to be sent to the receiving CPU 14. At step 104, the sending CPU 12 reads the address of the memory location (e.g., in memory area 16) referenced by the end pointer 20. As shown, the pointer logic is initially set to zero for both the start pointer and the end pointer. At step 105, the sending CPU 12 writes the data to be sent to the receiving CPU 14 into the memory location referenced by the end pointer 20 (from step 104). At step 106, the sending CPU 12 then updates the end pointer 20 with the memory location of the new endpoint (to account for the written in data) in the shared memory area 16, and also updates the pointer logic 150 by writing in a "1" for the end pointer.

Notably, in accordance with the preferred embodiment, when the logic (e.g., 150) which is implementing the pointers 18 and 20 first detects different logic values for these pointers, the logic circuitry generates an interrupt for the receiving CPU 14. For example, when the logic pointers have the equal values (e.g., Start: 0 and End: 0), and then those values are changed (e.g., Start: 0 and End: 1), an interrupt is generated and conveyed to the receiving CPU (e.g., at step 114).

Steps 108, 110, 111 and 112 illustrate how the sending CPU 12 can write additional data to an end pointer's location, etc., in accordance with the preferred embodiment. However, in this aspect of the embodiment, the logic circuitry does not generate an interrupt, because the values for the logic pointers (although changed to Start: 0 and End: 2) have not changed from equal values (e.g., Start: 0 and End: 0).

At step 116, in response to an interrupt 115 (e.g., from the logic circuitry 150 and step 114), the receiving CPU 14 reads the address of the memory location referenced by the start pointer 18. For example, the data to be transferred to the receiving CPU, which was written to the shared memory in step 105, starts at the address referenced by the start pointer 18. As shown, the start logic value is zero. At step 117, the receiving CPU 14 reads the data contained at the memory location referenced by the start pointer 18. At step 118, the receiving CPU 14 then updates the start pointer 18 with the memory location of the new startpoint (to account for the read in data) in the shared memory area 16, and also updates the pointer logic 150 by writing in a "1" for the start pointer. As shown, the pointer logic values are now Start: 1 and End: 2.

As such, in accordance with the preferred embodiment, as long as the start pointer and end pointer logic values are different in a cycle, the receiving CPU will read the data stored in the memory location referenced by the start pointer. For example, at step 120, the receiving CPU 14 reads the value of the end pointer 20 in the pointer logic 150. At step 121, since the receiving CPU 14 can determine that the value of the start pointer is not equal to the value of the end pointer (e.g., Start: 1 and End: 2), the receiving CPU reads any data stored at the memory location now referenced by the start pointer 18. At step 122, the receiving CPU then updates the start pointer 18 to the new memory location, and also updates the pointer logic 150 by writing in a "2" for the start pointer. As shown, the pointer logic values are now Start: 2 and End: 2. At step 124, the receiving CPU 14 reads the logic value of the end pointer 20. If the receiving CPU determines that the values of the start pointer 18 and end pointer 20 are equal, then the receiving CPU stops reading data from the shared memory (step 125), and the method 100 can be terminated.

In summary, by using the pointer logic (150) and method (100) in accordance with the preferred embodiment, the CPU interrupt load can be significantly reduced, because the receiving CPU will be interrupted only when new data from the sending CPU has arrived in the shared memory area while the receiving CPU was idle. Furthermore, in accordance with the preferred embodiment, while a large amount of data is being transferred from one CPU to another, the receiving CPU does not have to be interrupted at all. Moreover, a receiving CPU is not required to poll the shared memory in order to find new data.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for reducing interrupt load in a multi-processor system, comprising the steps of:

reading a start pointer value and an end pointer value, said start pointer associated with a first location in a memory area, and said end pointer associated with a second location in said memory area;

a first processor storing data at said second location;

updating said end pointer value in correspondence with said first processor storing said data at said second location;

determining if said end pointer value is equal or not equal to said start pointer value, said start pointer value in correspondence with a second processor retrieving data from said first location; and if said end pointer value is not equal to said start pointer value, and at said reading step, said end pointer value was equal to said start pointer value, generating an interrupt for said second processor.

2. The method of claim 1, wherein if said end pointer value is not equal to said start pointer value, and at said reading step, said end pointer value was not equal to said start pointer value, updating said end pointer and returning to said reading step.

3. The method of claim 1, wherein responsive to said reading step said end pointer value is equal to said start pointer value, terminating said reading step.

4. The method of claim 1, further comprising the steps of:

responsive to said interrupt, reading said start pointer value;

said second processor retrieving said data from said first location;

updating said start pointer value in correspondence with said second processor retrieving said data from said first location;

determining if said end pointer value is equal or not equal to said start pointer value; and if said end pointer value is not equal to said start pointer value, returning to the step of said second processor retrieving said data from said first location.

5. The method of claim 1, wherein said memory area is a shared memory.

6. The method of claim 1, wherein said end pointer value and said start pointer value comprise logic values.

7. The method of claim 1, wherein said multi-processor system comprises a plurality of central processors in a radio base station.

8. The method of claim 1, wherein said multi-processor system comprises a plurality of central processors in a WCDMA Base Transceiver Station.

9. The method of claim 1, wherein said multi-processor system comprises a plurality of central processors in a $3^{rd}$ Generation Partnership Project base station.

10. The method of claim 1, wherein said reading step and said determining step are performed by logic circuitry.

11. A method for reducing interrupt load in a multi-processor system, comprising the steps of:

responsive to an interrupt, reading a start pointer value, said start pointer associated with a first location in a memory area;

a first processor retrieving data from said first location;

updating said start pointer value in correspondence with said first processor retrieving said data from said first location;

determining if an end pointer value is equal or not equal to said start pointer value, said end pointer associated with a second location in said memory area, said end pointer value updated in correspondence with a second processor storing data in said second location; and if said end pointer value is not equal to said start pointer value, returning to the step of said first processor retrieving said data from said first location.

12. The method of claim 11, wherein said memory area is a shared memory.

13. The method of claim 11, wherein said end pointer value and said start pointer value comprise logic values.

14. The method of claim 11, wherein said multi-processor system comprises a plurality of central processors in a radio base station.

15. The method of claim 11, wherein said multi-processor system comprises a plurality of central processors in a WCDMA Base Transceiver Station.

16. The method of claim 11, wherein said multi-processor system comprises a plurality of central processors in a $3^{rd}$ Generation Partnership Project base station.

17. The method of claim 11, wherein said reading step and said determining step are performed by logic circuitry.

18. A multi-processor system, comprising:

a first processor;

a second processor;

a memory area, said memory area coupled to said first processor and said second processor for communications therebetween;

a start pointer associated with a first location in a memory area;

an end pointer associated with a second location in said memory area; and means for reading a start pointer value and an end pointer value, storing data at said second location, updating said end pointer value in correspondence with storing said data at said second location, determining if said end pointer value is equal or not equal to said start pointer value, said start pointer value in correspondence with said second processor retrieving data from said first location, and if said end pointer value is not equal to said start pointer value, but while reading said start pointer value and said end pointer value, said end pointer value was equal to said start pointer value, generating an interrupt for said second processor.

19. The multi-processor system of claim 18, wherein said memory area is a shared memory.

20. The multi-processor system of claim 18, wherein said end pointer value and said start pointer value comprise logic values.

21. The multi-processor system of claim 18, wherein said multi-processor system comprises a plurality of central processors in a radio base station.

22. The multi-processor system of claim 18, wherein said multi-processor system comprises a plurality of central processors in a WCDMA Base Transceiver Station.

23. The multi-processor system of claim 18, wherein said multi-processor system comprises a plurality of central processors in a $3^{rd}$ Generation Partnership Project base station.

24. The multi-processor system of claim 18, wherein said means includes a logic circuit.

* * * * *